US011706358B2

(12) United States Patent
Yamada

(10) Patent No.: US 11,706,358 B2
(45) Date of Patent: Jul. 18, 2023

(54) IMAGE DISPLAY METHOD, IMAGE DISPLAY APPARATUS, AND NON-TRANSITORY COMPUTER-READABLE STORAGE MEDIUM STORING DISPLAY CONTROL FOR DISPLAYING IMAGES IN DIFFERENT FORMS

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/389,818

(22) Filed: Jul. 30, 2021

(65) Prior Publication Data
US 2022/0038589 A1 Feb. 3, 2022

(30) Foreign Application Priority Data
Jul. 31, 2020 (JP) .................. 2020-130906

(51) Int. Cl.
H04N 1/00 (2006.01)

(52) U.S. Cl.
CPC ..... *H04N 1/00469* (2013.01); *H04N 1/00411* (2013.01); *H04N 1/00458* (2013.01)

(58) Field of Classification Search
None
See application file for complete search history.

(56) References Cited

U.S. PATENT DOCUMENTS

| 6,961,908 B2* | 11/2005 | Phillips ................. G06F 40/106 715/835 |
| 2009/0019399 A1* | 1/2009 | Matsunaga ......... G06F 3/04847 715/838 |
| 2012/0287165 A1 | 11/2012 | Yamada |

(Continued)

FOREIGN PATENT DOCUMENTS

| JP | 2011-221586 | 11/2011 |
| JP | 2012-238223 | 12/2012 |

(Continued)

OTHER PUBLICATIONS

JP-2018088054A English Translation, Figs 1, 2, 9, par 0022, 0024-0029, 0043, 0064-0067, 0071 (Year: 2018).*

(Continued)

*Primary Examiner* — Miya J Williams
(74) *Attorney, Agent, or Firm* — Workman Nydegger

(57) ABSTRACT

A method includes displaying, in a first display area, a first display image obtained by reducing a first image, and a second display image obtained by reducing a second image, which has a size different from the first image, displaying, when the first display image is selected, a first intermediate image based on the first image in a second display area, calculating and storing, when the first intermediate image is commanded to be enlarged and moved, the display coordinates of the first intermediate image with respect to an enlargement ratio and a prescribed position, and displaying, when the second display image is selected, a second intermediate image based on the second image and enlarged with respect to a position of the second image, the position corresponding to the prescribed position, in the second display area, according to the stored enlargement ratio and display coordinates.

9 Claims, 8 Drawing Sheets

(56) References Cited

U.S. PATENT DOCUMENTS

| | | | |
|---|---|---|---|
| 2016/0065763 A1* | 3/2016 | Kawaguchi | H04N 1/0044 |
| | | | 715/801 |
| 2016/0198052 A1* | 7/2016 | Shogaki | H04N 1/00392 |
| | | | 358/1.15 |
| 2020/0210033 A1* | 7/2020 | Yamada | G06F 3/04845 |

FOREIGN PATENT DOCUMENTS

| | | |
|---|---|---|
| JP | 2013-231973 | 11/2013 |
| JP | 5751281 | 7/2015 |
| JP | 2018088054 A * | 6/2018 |

OTHER PUBLICATIONS

JP-2018088054A English Translation of Abstract, Figs 1, 2, 9, par 0022, 0024-0029, 0043, 0064-0067, 0071 (Year: 2018).*

* cited by examiner

IMAGE DISPLAY METHOD, IMAGE DISPLAY APPARATUS, AND NON-TRANSITORY COMPUTER-READABLE STORAGE MEDIUM STORING DISPLAY CONTROL FOR DISPLAYING IMAGES IN DIFFERENT FORMS

The present application is based on, and claims priority from JP Application Serial Number 2020-130906, filed Jul. 31, 2020, the disclosure of which is hereby incorporated by reference herein in its entirety.

BACKGROUND

1. Technical Field

The present disclosure relates to an image display method, an image display apparatus, and a non-transitory computer-readable storage medium storing a display control program.

2. Related Art

With a mobile terminal apparatus or the like, a plurality of images are displayed on a screen.

An image display apparatus described in JP-A-2013-231973, for example, includes a first display area in which a plurality of thumbnail images are displayed and a second display area in which an image is displayed in correspondence with a thumbnail image selected from the plurality of thumbnail images. The image display apparatus holds enlargement conditions set for an image to be displayed in the second display area. When an image to be displayed in the second display area is selected, the image is displayed under the held enlargement conditions (see JP-A-2013-231973).

With the technology described in JP-A-2013-231973, the image display apparatus calculates an enlarged area according to display coordinates in display data and a distance from the display coordinates and displays an enlarged image (see FIG. 19 and the like in JP-A-2013-231973). Even when the original image is in different size, the technology can identify display coordinates.

With the technology, however, when an original image is converted to display data, the original image is first reduced. Therefore, when a large original image, for example, is first reduced, and is then enlarged and displayed, the displayed enlarged image is not always larger than the original image.

SUMMARY

One aspect that solves the above problem is an image display method for a terminal apparatus that includes a display section having an input section that accepts a touch input. The image display method comprises: acquiring a first image, which is rectangular, and a second image, which is rectangular and has a size different from the first image; displaying, in a first display area, a first display image obtained by reducing the first image and a second display image obtained by reducing the second image; displaying, when the first display image is selected by the touch input, a first intermediate image based on the first image in a second display area; calculating and storing, when the first intermediate image is commanded to be enlarged and moved by the touch input, a display coordinate of the first intermediate image commanded to be enlarged and moved with respect to an enlargement ratio and a prescribed position determined in advance; and displaying, when the second display image is selected by the touch input, a second intermediate image based on the second image and enlarged with respect to a position of the second image, the position corresponding to the prescribed position, in the second display area, according to the stored enlargement ratio and display coordinate.

One aspect that solves the above problem is an image display apparatus that includes: a display section having an input section that accepts a touch input; a display control section that performs display control in response to the touch input; and a storage section that stores a first image, which is rectangular, and a second image, which is rectangular and has a size different from the first image. The display control section: acquires the first image and second image stored in the storage section; displays, in a first display area, a first display image obtained by reducing the first image and a second display image obtained by reducing the second image; displays, when the first display image is selected by the touch input, a first intermediate image based on the first image in a second display area; calculates and stores, when the first intermediate image is commanded to be enlarged and moved by the touch input, a display coordinate of the first intermediate image commanded to be enlarged and moved with respect to an enlargement ratio and a prescribed position determined in advance, the display coordinate being stored in the storage section; and displays, when the second display image is selected by the touch input, a second intermediate image based on the second image and enlarged with respect to a position of the second image, the position corresponding to the prescribed position, in the second display area, according to the enlargement ratio and display coordinate stored in the storage section.

One aspect that solves the above problem is a non-transitory computer-readable storage medium storing a display control program that causes a terminal apparatus to execute display control, the terminal apparatus including a display section having an input section that accepts a touch input. The image display program comprises: causing the terminal apparatus to acquire a first image, which is rectangular, and a second image, which is rectangular and has a size different from the first image; causing the terminal apparatus to display, in a first display area, a first display image obtained by reducing the first image and a second display image obtained by reducing the second image; causing the terminal apparatus to display, when the first display image is selected by the touch input, a first intermediate image based on the first image in a second display area; causing the terminal apparatus to calculate and stores, when the first intermediate image is commanded to be enlarged and moved by the touch input, a display coordinate of the first intermediate image commanded to be enlarged and moved with respect to an enlargement ratio and a prescribed position determined in advance, the display coordinate being stored in the storage section; and causing the terminal apparatus to display, when the second display image is selected by the touch input, a second intermediate image based on the second image and enlarged with respect to a position of the second image, the position corresponding to the prescribed position, in the second display area, according to the enlargement ratio and display coordinate stored in the storage section.

DESCRIPTION OF EXEMPLARY EMBODIMENTS

An embodiment will be described below with reference to the drawings.

Figure 1:
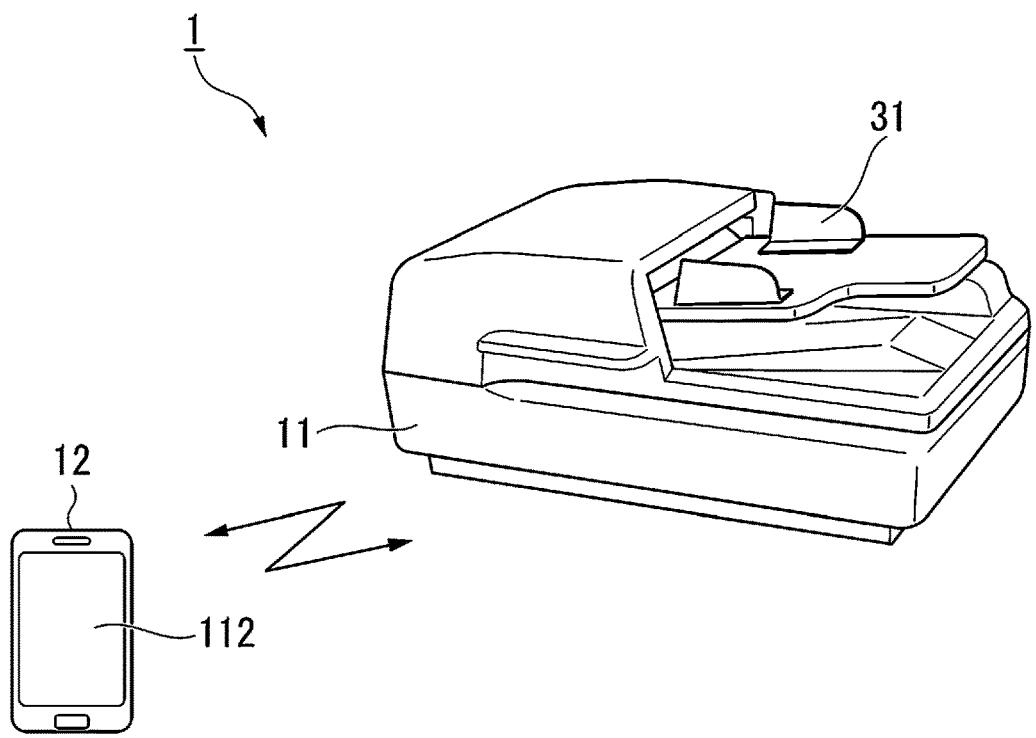
FIG. 1 schematically illustrates an example of the structure of an information processing system.

FIG. 1 schematically illustrates an example of the structure of an information processing system 1 in an embodiment.

The information processing system 1 has an image processing apparatus 11 and a terminal apparatus 12, which is mobile. The image processing apparatus 11 and terminal apparatus 12 wirelessly communicate with each other.

The terminal apparatus 12 is a portable apparatus that can be carried by the user. The terminal apparatus 12 is a tablet terminal apparatus, a smartphone, or the like.

The terminal apparatus 12 has a display section 112, which is a touch panel having touch input functions. The display section 112 is a display device. The terminal apparatus 12 is operated by the user. When operated, the terminal apparatus 12 displays various types of information on the display section 112.

The terminal apparatus 12 communicates with the image processing apparatus 11 to control image processing performed by the image processing apparatus 11.

The image processing apparatus 11 is controlled in response to a command or the like received from the terminal apparatus 12, and executes image processing according to what is controlled.

The image processing apparatus 11 has a scanner function. The image processing apparatus 11 reads a plurality of images by the scanner function, and wirelessly transmits data of the plurality of read images to the terminal apparatus 12. The image processing apparatus 11 has an auto document feeder 31. The image processing apparatus 11 automatically transports a plurality of sheets placed in the auto document feeder 31, and reads an image represented on each sheet. The sheet is in A4 size, A3 size, or another size. The number of the plurality of sheets may be arbitrary; the number may be 100, for example.

The terminal apparatus 12 receives the data of the plurality of images from the image processing apparatus 11, and displays a plurality of images on the display section 112 according to the received data.

The terminal apparatus 12 accepts a command matching an operation performed by the user for an image displayed on the display section 112, and executes processing in response to the accepted command.

When the user views images displayed on the display section 112 of the terminal apparatus 12, the user can confirm images processed by the image processing apparatus 11 in the form of a list or can edit these images.

Figure 2:
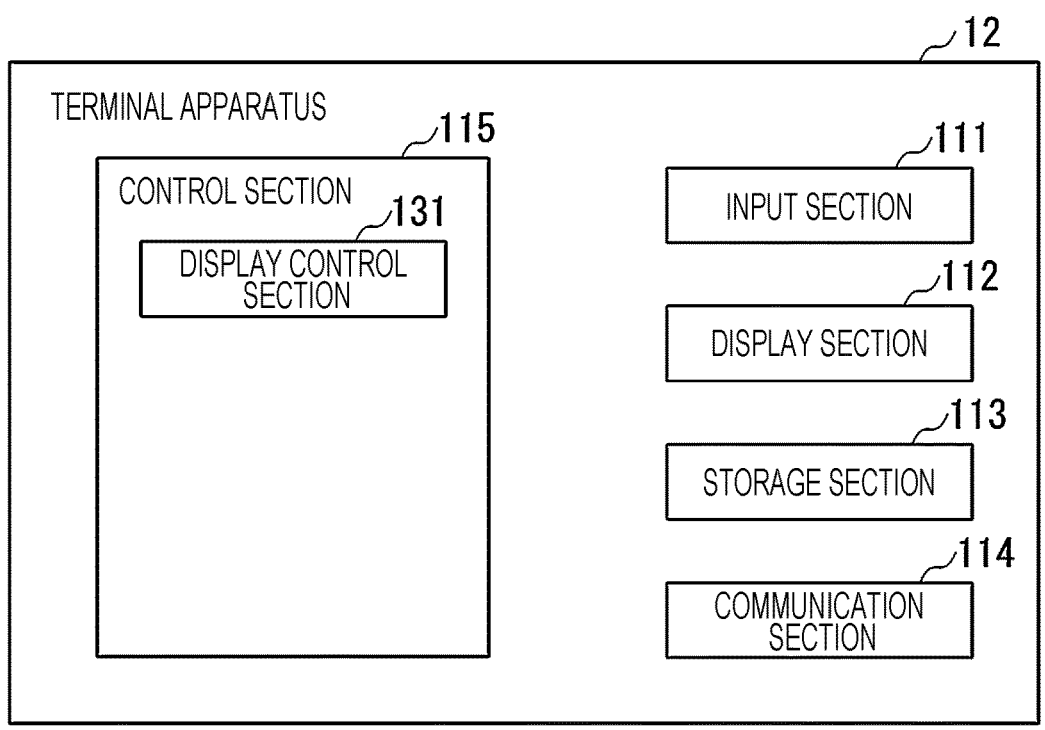
FIG. 2 is a functional block diagram illustrating an example of the structure of a terminal apparatus.

FIG. 2 is a block diagram illustrating an example of the structure of the terminal apparatus 12 in the embodiment.

Besides the display section 112, the terminal apparatus 12 has an input section 111, a storage section 113, a communication section 114, and a control section 115.

The control section 115 has a display control section 131.

The input section 111 and display section 112 are implemented as a screen having touch input functions.

The input section 111 accepts a touch operation performed on the screen by the user. The input section 111 detects a contact or travel of a touch pen or a finger of the user, and accepts the operation matching the detection result.

The display section 112 displays various types of information on the screen.

The storage section 113 stores various types of information. The stored information includes data of an original image eligible for a display and data of related images created according to the original image.

The storage section 113 is a memory having a read-only memory (ROM), a random-access memory (RAM), and the like.

The communication section 114 wirelessly communicates with the image processing apparatus 11.

The communication section 114 may be referred to as the communication circuit, communication port, or communication interface.

The control section 115 performs various types of processing and control. The control section 115 is a controller having a central processing unit (CPU).

As described above, the control section 115 includes the display control section 131.

The display control section 131 controls processing to display various types of information on the display section 112.

To perform various types of processing and control, the control section 115 causes the CPU to execute a control program stored in the storage section 113.

The control program includes a display control program that performs display control. When the CPU in the control section 115 executes the display control program stored in the storage section 113, functions of the display control section 131 are implemented.

The display control program may be an application program specific to the image processing apparatus 11. With the terminal apparatus 12, the display control program may be stored in the storage section 113 in advance or may be downloaded and installed.

In the structure, described above, of the terminal apparatus 12, the display control section 131 has been included in the control section 115. However, functions of the display control section 131, which performs display control, may be provided as a special functional section separate from the control section 115.

Display control performed by the terminal apparatus 12 will be described below.

The communication section 114 receives data of a plurality of images from the image processing apparatus 11.

The display control section 131 acquires the data of the plurality of images transmitted from the image processing apparatus 11. In the description below, it will be assumed that these images are original images.

The plurality of images are associated with page numbers, which are serial numbers. The page numbers may be assigned by the terminal apparatus 12 or by the image processing apparatus 11.

The display control section 131 sets a three-dimensional coordinate system for each of the plurality of images. In the description below, this three-dimensional coordinate system will be referred to as the local coordinate system. The local coordinate system is a three-dimensional orthogonal coordinate system.

Figure 3:
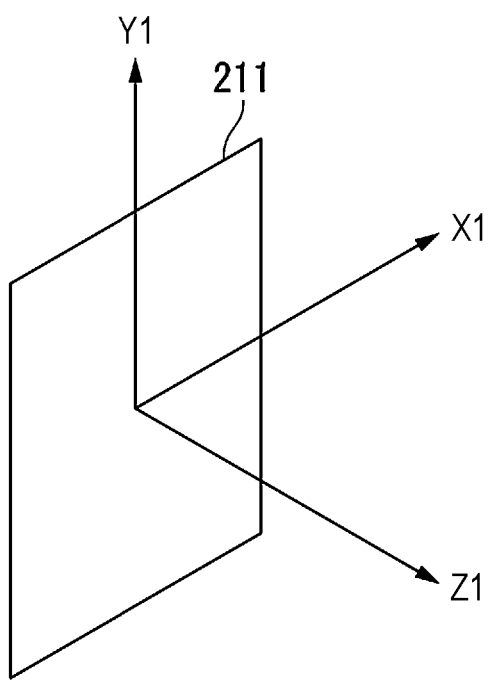
FIG. 3 illustrates an example of the local coordinate system of a single image.

FIG. 3 illustrates an example of the local coordinate system, in the embodiment, of a single image 211.

A local coordinate system, which is composed of an X1 axis, a Y1 axis and a Z1 axis, is set for the image 211.

A local coordinate system is set for each of the plurality of images.

Local coordinate systems individually set for the plurality of images may be placed in any layout.

The display control section 131 adjusts the position of each of the plurality of images with respect to the local coordinate system of the image.

The display control section 131 places the plurality of images in a three-dimensional coordinate system common to the plurality of images. In the description below, this common three-dimensional coordinate system will be referred to as the global coordinate system. The global coordinate system is a three-dimensional orthogonal coordinate system.

The display control section 131 maps an entire image in which a plurality of images are placed in the global coordinate system to a two-dimensional coordinate system, and uses the result of mapping as display data. The display data is pixel data. In the description below, each image corresponding to the display data will be referred to as a thumbnail image, and the two-dimensional coordinate system will be referred to as the display coordinate system. The display coordinate system is a two-dimensional orthogonal coordinate system. A display area for the display data is referred to as a view port.

Although, in the above description, a plurality of images have been placed and displayed in the global coordinate system, only one single image may be placed and displayed in the global coordinate system.

A thumbnail image is a small-sized image representing an original image.

Figure 4:
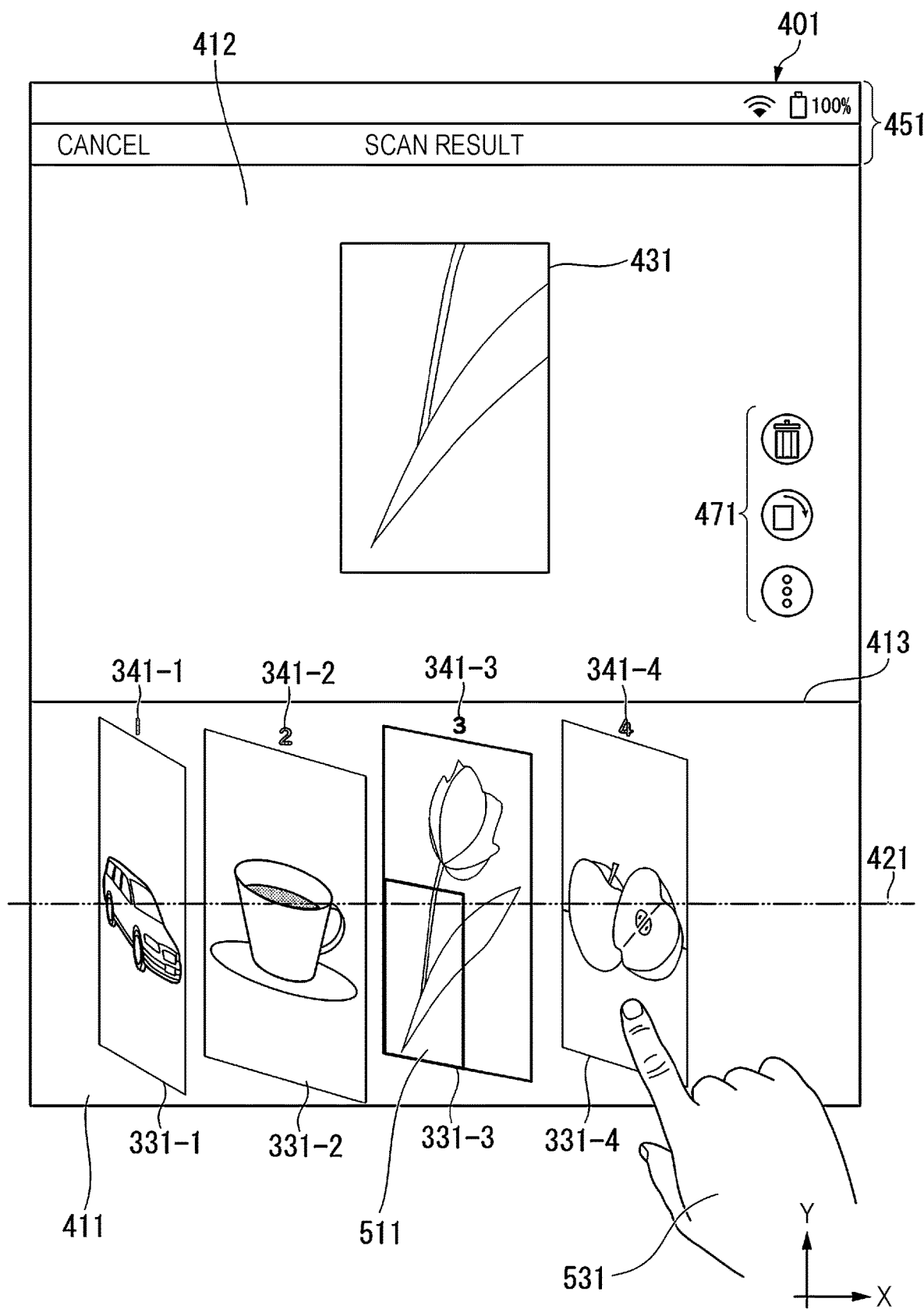
FIG. 4 illustrates an example of a first display screen.

FIG. 4 illustrates an example of a first display screen 401 in the embodiment.

The display coordinate system in FIG. 4 is composed of an X axis and a Y axis.

When the screen of the display section 112 of the terminal apparatus 12 is viewed from the front, the positive direction of the X axis is the right direction, the negative direction of the X axis is the left direction, the positive direction of the Y axis is the upward direction, and the negative direction of the Y axis is the downward direction. The display coordinate system may be arbitrarily placed on the screen.

The first display screen 401 is an example of the display screen on the display section 112 of the terminal apparatus 12.

The display area on the first display screen 401 is composed of a first display area 411, a second display area 412, and a third display area 451. The display area excluding the third display area 451 is divided into the first display area 411 and second display area 412.

The display control section 131 displays, in the third display area 451, a radio wave condition in wireless communication and "Cancel" or another text information indicating an operation that the user can perform.

The display control section 131 may not display the third display area 451.

The first display area 411 and second display area 412 are each a rectangular area formed by edges parallel to the X axis and edges parallel to the Y axis.

In FIG. 4, the first display area 411 and second display area 412 are illustrated so that the edges parallel to the X axis are longer than the edges parallel to the Y axis. However, this is not a limitation.

With respect to the Y axis, the first display area 411 is placed on the negative side of the Y axis and the second display area 412 is placed on the positive side of the Y axis. With respect to the X axis, the first display area 411 and second display area 412 have edges of the same length. The first display area 411 and second display area 412 are placed so that the edges of the first display area 411 on the positive side of the Y axis and the edges of the second display area 412 on the negative side of the Y axis overlap each other. Thus, the whole of the first display area 411 and second display area 412 forms a rectangular display area.

On the first display screen 401 in FIG. 4, the boundary line between the first display area 411 and the second display area 412 is displayed as a boundary axis 413. However, the boundary axis 413 may not be displayed.

In FIG. 4, a plurality of thumbnail images 331 are displayed side by side along a virtual axis 421 in the first display area 411. In the first display area 411, the plurality of thumbnail images 331 are placed in ascending order of page numbers from the negative side of the X axis toward its positive side.

The virtual axis 421, which is virtual as indicated by its name, is not displayed in actual practice. However, the virtual axis 421 may be displayed as another example of the structure.

In FIG. 4, the virtual axis 421 is parallel to the X axis and passes through the midpoint of the first display area 411 in the direction parallel to the Y axis.

In FIG. 4, each of a plurality of thumbnail images 331 is indicated as an i-th thumbnail image 331-$i$ (where i is an integer greater than or equal to 1) in the order of page numbers. The maximum number P of the page numbers indicates the number of thumbnail images 331. A thumbnail image the page number of which is not important will be represented simply as a thumbnail image 331.

In FIG. 4, the i-th thumbnail image 331-$i$ is a rectangular image.

The i-th thumbnail image 331-$i$ may be displayed so that the length along the Y axis is longer than the length along the X axis. Alternatively, the i-th thumbnail image 331-$i$ may be placed in another orientation; the orientation of the placement may be changed.

In the first display area 411, the display control section 131 places a k-th thumbnail image 331-$k$, which is on a k-th page, close to the center of the first display area 411 along the virtual axis 421 so that the angle between the display surface and the surface of the original image is small, and until a prescribed number m of thumbnail images 331 starting from the center, places a (k+m)th thumbnail image 331-$k$+m distant from the center so that the angle between the display surface and the surface of the original image is larger when compared with the k-th thumbnail image 331-$k$ (k is an integer greater than or equal to 1 and smaller than or equal to P, and m is integer smaller than k). The angle between the display surface and the surface of the original image is an angle formed by a Z axis perpendicular to the display surface and the Z1 axis of the i-th thumbnail image 331-$i$. In the first display area 411, the display control section 131 places and displays thumbnail images 331 distant from the center by more than the prescribed number m of pages, at equal intervals along the virtual axis 421.

In the first display area 411, portions most distant from the center of the along the virtual axis 421 are equivalent to the right and left edges of the first display area 411.

Each of a plurality of thumbnail images 331 is displayed together with an assigned image, which is an image of the page number of the thumbnail image 331.

In FIG. 4, an image of the page number of the i-th thumbnail image 331-i as an i-th page number image 341-i.

In FIG. 4, the display control section 131 displays four thumbnail images 331 in the first display area 411 without a portion in which other thumbnail images 331 are displayed at equal intervals.

In FIG. 4, a third thumbnail image 331-3 on a third page and a third page number image 341-3 are displayed in the vicinity of the center of the first display area 411 along the virtual axis 421. A fourth thumbnail image 331-4 having a larger page number than the third page is displayed in ascending order of page numbers toward the positive direction of the X axis from the vicinity of the center of the first display area 411 along the virtual axis 421. Similarly, a second thumbnail image 331-2 and a first thumbnail image 331-1, which have a smaller page number than the third page, are displayed in descending order of page numbers toward the negative direction of the X axis from the vicinity of the center of the first display area 411 along the virtual axis 421.

The display control section 131 adjusts the placement of the i-th page number image 341-i in the local coordinate system of the i-th thumbnail image 331-i so as to match the placement of the i-th thumbnail image 331-i. The display control section 131 creates display data in the display coordinate system, the display data including the i-th thumbnail image 331-i and i-th page number image 341-i.

The display control section 131 places and displays the i-th page number image 341-i on the positive side of the Y axis with respect to the i-th thumbnail image 331-i.

The display control section 131 places the i-th page number image 341-i so that it is included inside the first display area 411. The display control section 131 displays the i-th page number image 341-i so that it does not protrude outwardly beyond the boundary axis 413, which is the boundary line of the first display area 411 on the positive side of the Y axis. In FIG. 4, the boundary line is parallel to the X axis.

As another example of the structure, the display control section 131 may display the i-th page number image 341-i so that part or the whole of it protrudes outwardly beyond the first display area 411.

The display control section 131 adjusts density with which the i-th page number image 341-i is displayed on a per-page basis.

In the adjustment of density, transparency may be adjusted. When transparency is low, density becomes high; when transparency is high, density becomes low.

The display control section 131 may change at least one of the shape, size, orientation, density, placement position, display color, and other display parameters of the i-th page number image 341-i corresponding to the i-th thumbnail image 331-i, according to the display parameters of the i-th thumbnail image 331-i.

In FIG. 4, the display control section 131 has placed the i-th page number image 341-i corresponding to the i-th thumbnail image 331-i on the positive side of the Y axis with respect to the i-th thumbnail image 331-i. However, this is not a limitation. The display control section 131 may place the i-th page number image 341-i corresponding to the i-th thumbnail image 331-i on the negative side of the Y axis, the positive side of the X axis, or the negative side of the X axis with respect to the i-th thumbnail image 331-i.

In FIG. 4, the display control section 131 has placed the i-th page number image 341-i corresponding to the i-th thumbnail image 331-i outside the i-th thumbnail image 331-i. However, this is not a limitation. The display control section 131 may place the i-th page number image 341-i corresponding to the i-th thumbnail image 331-i inside the i-th thumbnail image 331-i.

FIG. 4 has illustrated a case in which the original images of a plurality of thumbnail images 331 displayed in the first display area 411 are in different sizes. In this case, the display control section 131 performs processing for having all thumbnail images 331 have the same length with respect to either or both of the X axis and Y axis. In another example of the structure, however, thumbnail images 331 in different sizes may be displayed in the first display area 411 according to the sizes of their respective original images. In FIG. 4, there is a difference in size between the original image of the third thumbnail image 331-3 and the original image of the fourth thumbnail image 331-4.

The original images of the plurality of thumbnail images 331 displayed in the first display area 411 may be in the same size.

The virtual axis 421 is a straight line. In another example of the structure, however, the virtual axis 421 may be a line other than a straight line.

The virtual axis 421 may be a line that bends toward the positive side of the Y axis when the virtual axis 421 extends from the central position of the first display area 411 on the X axis toward the positive side of the X axis and also bends toward the positive side of the Y axis when the virtual axis 421 extends from the central position of the first display area 411 on the X axis toward the negative side of the X axis. The virtual axis 421 may be a line on which the positive side of the X axis and its negative side from the central position of the first display area 411 on the X axis may be symmetric with respect the central position.

The display control section 131 displays, in the second display area 412, an image corresponding to the i-th thumbnail image 331-i, which is one of the plurality of thumbnail images 331 displayed in the first display area 411. In the description below, this image will be referred to as the intermediate image. In FIG. 4, a first intermediate image 431 corresponding to the third thumbnail image 331-3 is displayed in the second display area 412.

The intermediate image is larger than its relevant i-th thumbnail image 331-i. Although the intermediate image is smaller than the original image, the intermediate image may have the same size as the original image or may be larger than the original image, depending on the size of the original image.

The i-th thumbnail image 331-i for which an intermediate image is to be displayed is the i-th thumbnail image 331-i already selected in the first display area 411 and is the k-th thumbnail image 331-k placed in the vicinity of the center of the first display area 411 along the virtual axis 421. This selection is performed by an operation by the user in the first display area 411 or second display area 412.

The display control section 131 controls a display mode for the i-th page number image 341-i. In another example of the structure, however, the display mode of the i-th page number image 341-i may remain unchanged. The display control section 131 may not display the i-th page number image 341-i.

When the display control section 131 detects that the user has performed a prescribed operation on the terminal apparatus 12, the display control section 131 perform control in which a switchover is made to the image to be displayed in the second display area 412.

When the display control section 131 detects that the user has performed an operation to swipe the first intermediate image 431 displayed in the second display area 412, the display control section 131 displays, in the second display area 412, the intermediate image on the next page after the first intermediate image 431.

Under control of the display control section 131, when the operation is to move a finger or the like from the positive side of the X axis toward its negative side, the intermediate image on the page with a one larger page number is displayed; and when the operation is to move a finger or the like from the negative side of the X axis toward its positive side, the intermediate image on the page with a one smaller page number is displayed.

When the display control section 131 detects that the user has performed an operation to touch a thumbnail image 331 other than the currently selected i-th thumbnail image 331-i from the plurality of thumbnail images 331 displayed in the first display area 411, the display control section 131 places the touched thumbnail image 331 in a state in which it is currently selected and displays the intermediate image corresponding to the touched thumbnail image 331 in the second display area 412.

In FIG. 4, under control of the display control section 131, a prescribed icon group 471 is displayed in the second display area 412. When an operation to, for example, tap one icon of the icon group 471 with a finger of the user or the like, the display control section 131 accepts a command matching the operation. The display control section 131 may display any icons in either or both of the first display area 411 and second display area 412.

In another example of the structure, when an operation to, for example, tap a prescribed place on the display section 112 by a finger of the user or the like, the display control section 131 may display a prescribed menu on the display section 112. When an operation to, for example, tap a prescribed place in the menu by a finger of the user or the like, the display control section 131 accepts a command matching the operation.

In FIG. 4, a first frame 511 is illustrated in the third thumbnail image 331-3 placed at the center along the virtual axis 421 in the first display area 411.

The first frame 511 encloses an image portion to be displayed in the second display area 412. In FIG. 4, an image portion in the first frame 511 is displayed in the second display area 412.

Although, in FIG. 4, the first frame 511 is illustrated so as to be visible, it may be displayed or may not be displayed.

In FIG. 4, the fourth thumbnail image 331-4 on the fourth page is clicked and selected by the hand 531 of the user.

Thus, the display control section 131 makes a switchover to a display in which the fourth thumbnail image 331-4 selected by the user is placed at the center along the virtual axis 421 in the first display area 411.

The i-th thumbnail image 331-i and first frame 511 may have any relative positional relationship.

The first frame 511 may be placed at a position within the i-th thumbnail image 331-i. Alternatively, the first frame 511 may be placed at a position at which the first frame 511 includes part of the i-th thumbnail image 331-i and also includes an area outside the i-th thumbnail image 331-i.

Figure 5:
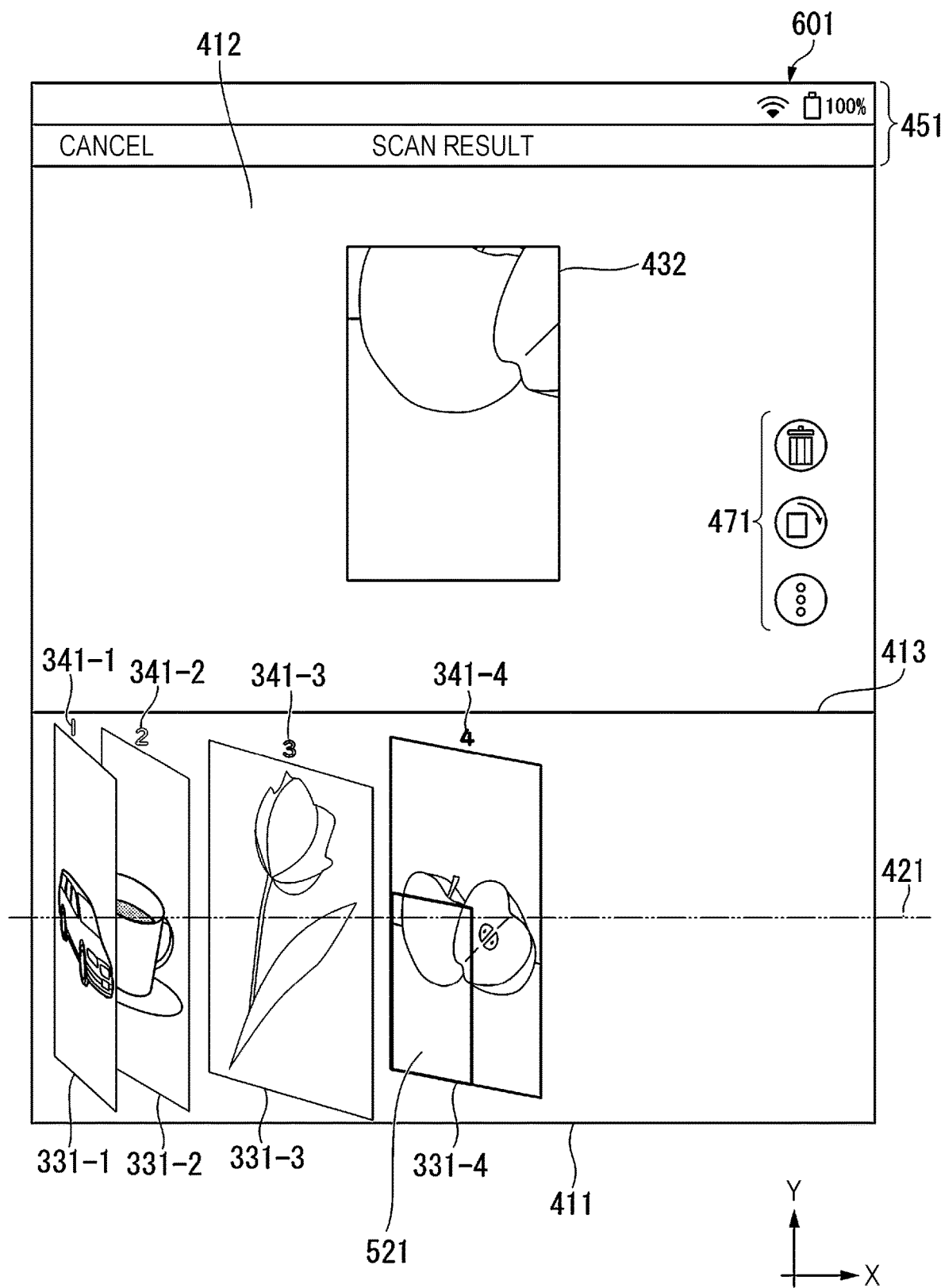
FIG. 5 illustrates an example of a second display screen.

FIG. 5 illustrates an example of a second display screen 601 in the embodiment.

The second display screen 601 is displayed by the display control section 131 when the fourth thumbnail image 331-4 is selected on the first display screen 401 by the user.

The display control section 131 displays a plurality of thumbnail images 331 in the first display area 411 on the second display screen 601 with the fourth thumbnail image 331-4 placed at the center along the virtual axis 421.

In FIG. 5, a second frame 521 is illustrated in the fourth thumbnail image 331-4 placed at the center of the first display area 411 along the virtual axis 421.

The second frame 521 encloses an image portion to be displayed in the second display area 412. In FIG. 5, an image portion in the second frame 521 is displayed in the second display area 412.

How an image eligible for enlargement is enlarged will be described below.

In the description below, an image eligible for enlargement will be referred to as a target image. A target image is an original image.

The display control section 131 enlarges the target image according to a prescribed position of the target image, an enlargement ratio setting, and display coordinate settings.

The display control section 131 enlarges the target image at the enlargement setting with respect to the prescribed position of the target image, and displays part of the enlargement result at the display coordinates.

Display coordinates are determined by a frame. The display control section 131 calculates display coordinates in the local coordinate system. From the viewpoint of the appearance of the display coordinate system, the frame corresponds to the first frame 511 in FIG. 4 and to the second frame 521 in FIG. 5.

The enlargement ratio is determined by the size of the original image and the size of the frame.

The enlargement ratio can be changed by an operation by the user. The display control section 131 changes the enlargement ratio according to the operation performed by a finger of the user or the like for the intermediate image displayed in the second display area 412. The operation is a pinch-in or pinch-out operation. In this operation, movement and enlargement are commanded. A movement command corresponds to a swipe operation, and an enlargement command corresponds to a zoom operation. An enlargement command may be made by a double tap.

The prescribed position of the target image is any of the central position of the target image, a corner of it, and the central position of an edge of the target image.

The display control section 131 determines the prescribed position according to the relative positional relationship between the target image and the frame.

The display control section 131 enlarges the target image with respect to the prescribed position of the target image.

When the prescribed position is the central position of the target image, the display control section 131 radially enlarges the target image with respect to the central position.

When the prescribed position is a corner of the target image, the display control section 131 enlarges the target image with respect to the corner.

When the prescribed position is the central position of an edge of the target image, the display control section 131 enlarges the target image with respect to the central position of the edge.

It will be assumed that the display control section 131 determines the prescribed position from a plurality of candidates. However, a prescribed position may be uniquely determined. A plurality of candidates for the prescribed position or a uniquely determined prescribed position is stored in the storage section 113 in the terminal apparatus 12.

It will be assumed that the display control section 131 determines the prescribed position according to the relative positional relationship between the target image and the frame, as described above. However, when the intermediate image displayed in the second display area 412 has a corner, the corner may be determined as the prescribed position.

As described above with reference to FIGS. 4 and 5, the terminal apparatus 12 has the display section 112 having the input section 111 that accepts a touch input. The terminal apparatus 12 acquires a plurality of rectangular original images in different sizes, after which the terminal apparatus 12 displays, in the first display area 411, a plurality of thumbnail images 331 obtained by reducing these original images, and also displays, in the second display area 412, an intermediate image based on the i-th thumbnail image 331-i selected by a touch input. When the intermediate image is commanded to be enlarged and moved by a touch input, the terminal apparatus 12 calculates the display coordinates of the intermediate image commanded to be enlarged and moved with respect to an enlargement ratio and a prescribed position determined in advance, and stores the display coordinates. When another i-th thumbnail image 331-i is selected by a touch input, the terminal apparatus 12 displays, in the second display area 412, an intermediate image enlarged with respect to the prescribed position determined in advance for the other i-th thumbnail image 331-i, according to the stored enlargement ratio and display coordinates.

The terminal apparatus 12 uses any of the central position of the original image, a corner of it, and the central position of an edge of the original image as the prescribed position determined in advance.

As the prescribed position determined in advance, the terminal apparatus 12 may use the central position of the original image, a corner of it, or the central position of an edge of the original image, whichever is the closest to the display coordinates.

When the intermediate image displayed in the second display area 412 by being commanded to be enlarged and moved by a touch input has a corner, the terminal apparatus 12 may use the corner as the prescribed position determined in advance.

The terminal apparatus 12 places a plurality of thumbnail images 331 along the virtual axis 421.

A touch input on the terminal apparatus 12 is a command made by a pinch-in or pinch-out operation.

Figure 6:
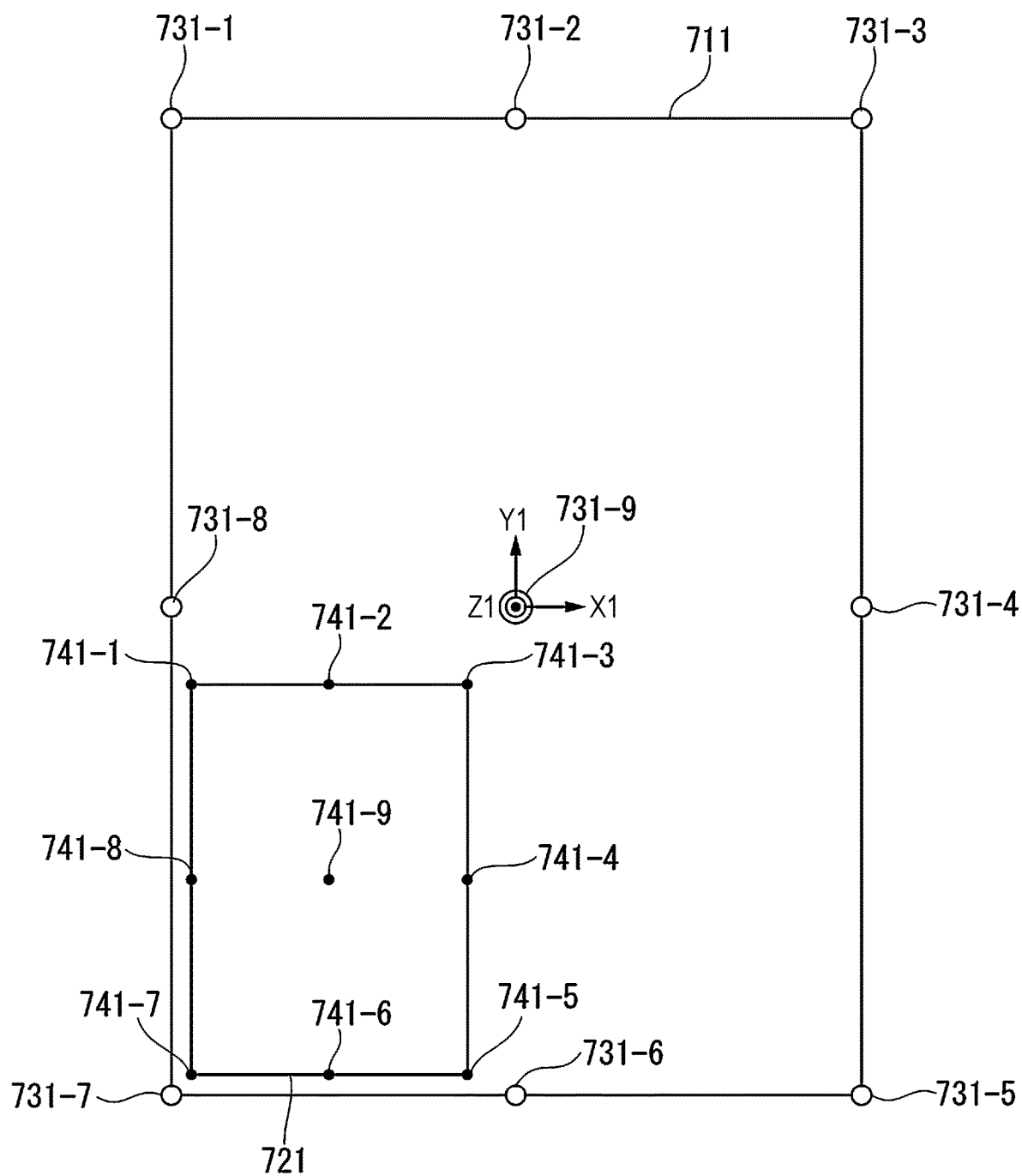
FIG. 6 illustrates a relative positional relationship between a first target image and a third frame.

FIG. 6 illustrates a relative positional relationship between a first target image 711 and third frame 721 in the embodiment.

In FIG. 6, a local coordinate system similar to the local coordinate system in FIG. 3 is illustrated.

The first target image 711 is an example of a target image. The third frame 721 is an example of a frame in the local coordinate system of the first target image 711.

A first target point 731-1 to an eighth target point 731-8 are set along the outline of the first target image 711.

A ninth target point 731-9 is further set at the central position of the first target image 711.

In FIG. 6, the first target point 731-1 is the point of the corner at the extreme end on the negative side of the X1 axis and at the extreme end on the positive side of the Y1 axis.

The second target point 731-2 is the point at the center on the edge at the extreme end on the positive side of the Y1 axis.

The third target point 731-3 to the eighth target point 731-8 are further set in that order after the second target point 731-2 along the outline of the first target image 711.

The first target point 731-1, third target point 731-3, fifth target point 731-5, and seventh target point 731-7 are the points of their respective corners. The second target point 731-2, fourth target point 731-4, sixth target point 731-6, and eighth target point 731-8 are the points at the center of their respective edges.

The third frame 721 is a rectangular frame. The area of the third frame 721 is smaller than the area of the first target image 711.

A first frame point 741-1 to an eighth frame point 741-8 are set along the outline of the third frame 721. The first frame point 741-1 to eighth frame point 741-8 of the third frame 721 are set at the corners of the third frame 721 and the central positions of the edges of the third frame 721 in correspondence with the first target point 731-1 to eighth target point 731-8 of the first target image 711.

A ninth frame point 741-9 is further set at the central position of the third frame 721.

The display control section 131 calculates the distances between the first target point 731-1 to ninth target point 731-9 of the first target image 711 and their respective first frame point 741-1 to ninth frame point 741-9 of the third frame 721, and uses a point involved in the shortest distance as the reference position in enlargement.

In FIG. 6, the seventh target point 731-7 of the first target image 711 is involved in the shortest distance between mutually corresponding points. Among the nine distances between mutually corresponding points, the distance between the seventh target point 731-7 and the seventh frame point 741-7 is the shortest.

Figure 7:
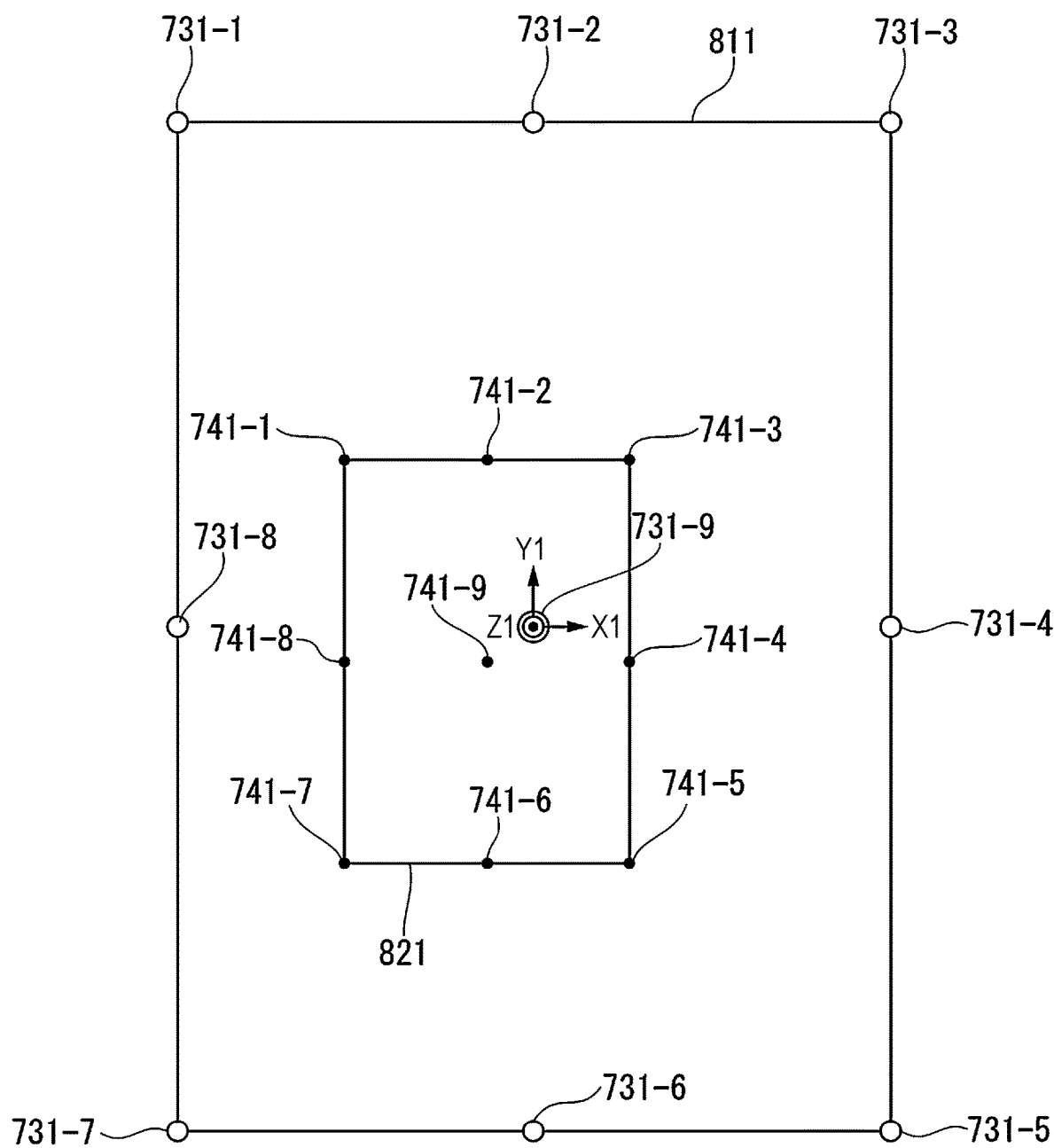
FIG. 7 illustrates a relative positional relationship between a second target image and a fourth frame.

FIG. 7 illustrates a relative positional relationship between a second target image 811 and fourth frame 821 in the embodiment.

The second target image 811 and fourth frame 821 are respectively similar to the first target image 711 and third frame 721 in FIG. 6 except that relative positions between the second target image 811 and the fourth frame 821 differ from those in FIG. 6.

In FIG. 7, the ninth target point 731-9 of the second target image 811 is involved in the shortest distance between mutually corresponding points. Among the nine distances between mutually corresponding points, the distance between the ninth target point 731-9 and the ninth frame point 741-9 is the shortest.

How the intermediate image displayed in the second display area 412 is changed will be described with reference to FIGS. 8 and 9.

When the intermediate image displayed in the second display area 412 is to be changed, the display control section 131 uses the enlargement ratio and display coordinates of the intermediate image before the change in the display of the next intermediate image. The display control section 131 stores the current enlargement ratio and display coordinates in the storage section 113.

Figure 8:
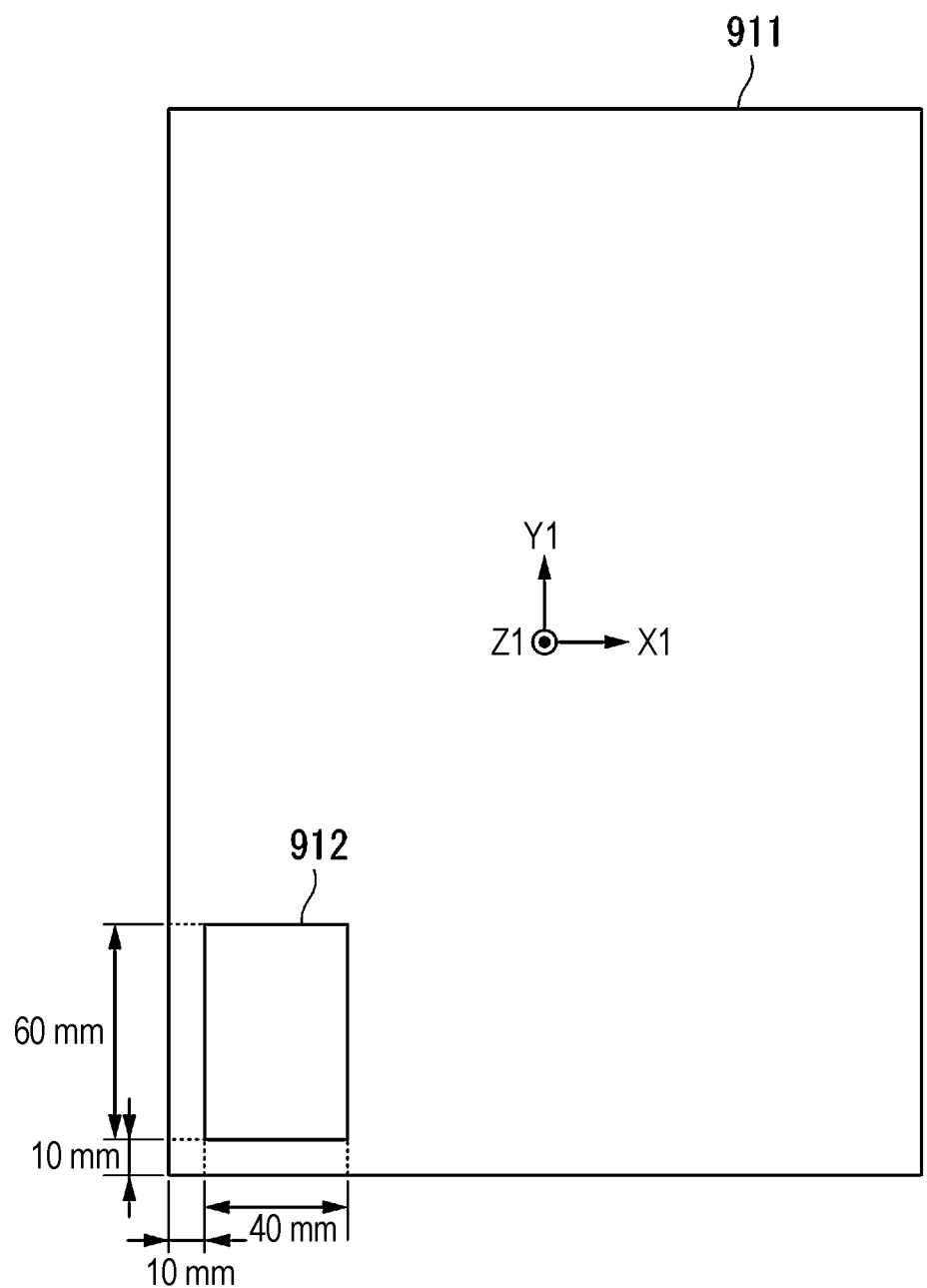
FIG. 8 illustrates a relative positional relationship between a third target image and a fifth frame.
Figure 9:
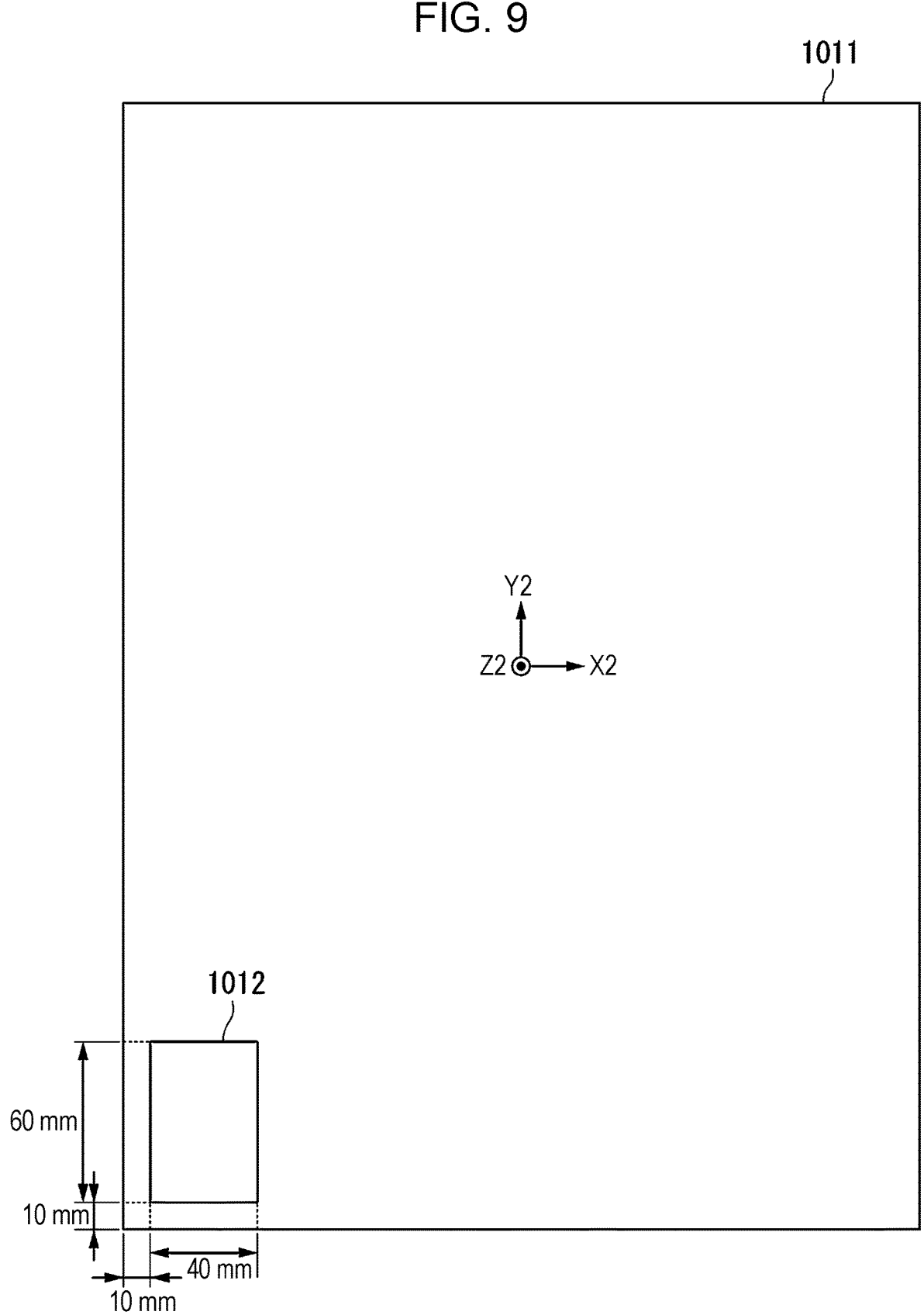
FIG. 9 illustrates a relative positional relationship between a fourth target image and a sixth frame.

In FIGS. 8 and 9, the positions of the frame are numerically indicated with respect to the lower left corner when viewed toward the drawing sheet. The numeric values in the drawings are just an example for the sake of explanation, and are not a limitation.

FIG. 8 illustrates a relative positional relationship between a third target image 911 and fifth frame 912 in the embodiment.

In FIG. 8, a local coordinate system composed of an X1 axis, a Y1 axis, and a Z1 axis is illustrated as the local coordinate system of the third target image 911.

The third target image 911, which is an example of a target image, is an A4-sized image. The fifth frame 912 is an example of a frame in the local coordinate system of the third target image 911.

FIG. 9 illustrates a relative positional relationship between a fourth target image 1011 and sixth frame 1012 in the embodiment.

In FIG. 9, a local coordinate system composed of an X2 axis, a Y2 axis, and a Z2 axis is illustrated as the local coordinate system of the fourth target image 1011.

The fourth target image 1011, which is an example of a target image, is an A3-sized image. The sixth frame 1012 is an example of a frame in the local coordinate system of the fourth target image 1011.

Here, it will be assumed that the display control section 131 enlarges an image portion enclosed by the fifth frame 912 in the third target image 911 and displays the enlarged portion in the second display area 412 as an intermediate image. In a state in which the intermediate image in which the image portion enclosed by the fifth frame 912 is enlarged is displayed in the second display area 412, it will be assumed that the user selects the intermediate image or thumbnail image corresponding to the fourth target image 1011. Then, the display control section 131 enlarges an image portion enclosed by the sixth frame 1012 in the fourth target image 1011 and displays the enlarged portion in the second display area 412 as an intermediate image.

In FIGS. 8 and 9, the display control section 131 sets an offset for each of the third target image 911 and fourth target image 1011 with reference to a point determined in advance and places the fifth frame 912 and sixth frame 1012 so as to be offset from the their respective points.

The third target image 911 and fourth target image 1011 have the same offset. The fifth frame 912 and sixth frame 1012 have the same shape and the same size.

When there is a match between the point determined in advance for the third target image 911 and the reference position, on the fifth frame 912, corresponding to the point determined in advance, the offset is zero. Similarly, when there is a match between the point determined in advance for the fourth target image 1011 and the reference position, on the sixth frame 1012, corresponding to the point determined in advance, the offset is zero.

An example in which the user uses the display screen of the terminal apparatus 12 will be described below.

When, for a plurality of thumbnail images 331 displayed in the first display area 411, the user repeatedly taps, with a finger of the user or the like, the adjacent thumbnail image 331 shifted one location from the thumbnail image 331 in the vicinity of the center toward the positive side of the X axis, the intermediate image to be displayed in the second display area 412 can be changed in succession in ascending order of page numbers. At this time, the display control section 131 makes a control to display, in the second display area 412, the intermediate image corresponding to the thumbnail image 331 tapped with the finger of the user or the like.

In this case, when the original images of all thumbnail images 331 are in the same size, the display portion of each intermediate image displayed in the second display area 412 occupies relatively the same portion on a sheet in the same size. When a page number is indicated at the same place on each sheet of a page, it will be assumed that a portion including the place is the display portion of each intermediate image. Then, when the user continues to tap the same place in the first display area 411, the user can confirm that the page number is changed in succession in the second display area 412. In this tapping, the user does not need to change the relative position of the finger or the like on the terminal apparatus 12.

When the page number is assigned at a corner of the sheet or in the vicinity of the central position on a prescribed edge of the sheet, the corner of the sheet or the vicinity of the central position on the prescribed edge is the reference position.

Now, a case will be described in which a plurality of thumbnail images 331 include a thumbnail image 331 the original image of which is in a different size.

It will be assumed that both A4-sized and A3-sized sheets are included, in which case each type of sheet includes a page number at a corner or in the vicinity of the central position of an edge, the corner or edge being at the corresponding position between the two types of sheets, and that on each type of sheet, a position close to the place at which the page number is indicated is used as the reference position. Then, when the user continues to tap the same place in the first display area 411 for the plurality of thumbnail images 331 displayed in the first display area 411, the user can confirm that the page number is changed in succession in the second display area 412. In this case, for both the A4-sized and A3-sized sheets, the page number can be displayed in the second display area 412.

It will be assumed that both A4-sized and A3-sized sheets are included, in which case each type of sheet includes a page number at a prescribed place in the vicinity of a corner or edge, and that on each type of sheet, its central position is used as the reference position. Then, when the user continues to tap the same place in the first display area 411 for the plurality of thumbnail images 331 displayed in the first display area 411, the user can confirm that the page number displayed in the second display area 412 is changed in succession for the sheets in the same size. When the page number assigned to the A4-sized sheet is displayed in the second display area 412, the page number assigned to the A3-sized sheet may not be displayed in the second display area 412. Conversely, when the page number assigned to the A3-sized sheet is displayed in the second display area 412, the page number assigned to the A4-sized sheet may not be displayed in the second display area 412.

A case in which pages are changed in succession in ascending order of page numbers has been described. This is also true when pages are changed in succession in descending order of page numbers. Specifically, when, for a plurality of thumbnail images 331 displayed in the first display area 411, the user repeatedly taps, with a finger of the user or the like, the adjacent thumbnail image 331 shifted one location from the thumbnail image 331 in the vicinity of the center toward the negative side of the X axis, the intermediate image to be displayed in the second display area 412 can be changed in succession in descending order of page numbers.

As described above, the terminal apparatus 12 in the information processing system 1 in this embodiment acquires a plurality of original images in different sizes and displays a plurality of thumbnail images 331 based on these original images in the first display area 411. The terminal apparatus 12 also displays, in the second display area 412, an intermediate image corresponding to one thumbnail image 331 selected from the plurality of thumbnail images 331. When an operation is performed to enlarge and move the image displayed in the second display area 412, the terminal apparatus 12 stores the enlargement ratio and display coordinates. When another thumbnail image 331 is selected, the terminal apparatus 12 calculates the display coordinates of an image to be displayed as the intermediate image with respect to a prescribed position according to the stored enlargement ratio and display coordinates.

Therefore, the terminal apparatus 12 enables the user to easily confirm images obtained by enlarging a plurality of original images in succession.

When the terminal apparatus 12 displays intermediate images based on original images in different sizes in succession, the terminal apparatus 12 can display the same font of text in substantially the same size in the intermediate images, in spite of different original image sizes.

Since the terminal apparatus 12 uses a corner displayed in the second display area 412 as the reference position, even when original images are in different sizes, the terminal apparatus 12 can display intermediate images at substantially the same position. Thus, when a page number or the like is displayed in the vicinity of a corner, the terminal apparatus 12 can display the page number or the like regardless of the original image size. This is also true when the central position of an edge is used instead of a corner. Thus, the terminal apparatus 12 enables the user to easily confirm the page number or the like.

When the central position of an original image is used as the reference position, at least one of an intermediate image obtained from an A4-sized original image and an intermediate image obtained from an A3-sized original image has the possibility that the page number or the like displayed in the second display area 412 is not at a prescribed position. Therefore, when the user views the second display area 412, the user can notice that the original image size is different.

When a page is moved by a swipe operation alone, the enlargement ratio and display coordinates may be reset during page movement. This has been inconvenient for the user when the user confirms a mark, such as a page number, that is present at the same place on each page. In particular, this has been significantly inconvenient when the screen is small as with a smartphone. A thumbnail image 331 may be displayed as an interrupt from the outside of the screen at the time the thumbnail image 331 needed, as in Navigation Drawer, or a tapped thumbnail image 331 may be displayed without the prescribed place of the page number being changed. Then, when the user confirms as many as several tens of pages, many operations have been needed, annoying the user.

In view of this, while an intermediate image obtained by enlarging an original image is displayed in the second display area 412 by the terminal apparatus 12, an operation is performed on the intermediate image to move and enlarge the display portion in the page and the page is moved by tapping the thumbnail image 331 displayed in the first display area 411 while the enlargement ratio and display coordinates are held. This enables the user to easily confirm a mark image, such as a page number, displayed at the same place when the user confirms a scan result or the like.

With the terminal apparatus 12, the tapped thumbnail image 331 is moved to the vicinity of the center of the first display area 411 and second display area 412 along the X axis during page movement. Thus, the user can change pages in succession by repeatedly tapping the same place without having to change the position of a finger or the like while the user views the intermediate image displayed in the second display area 412. This lessens the movement of the user's line of vision.

As described above, when the user confirms a scan result or the like, the terminal apparatus 12 in this embodiment enables the user to easily confirm a page number or an enlarged image in the vicinity of the page number. The terminal apparatus 12 also enables the user to confirm only a specific place on the original image besides a page number. Even when the page is moved, the user can also easily identify a place at which an intermediate image of an original image is displayed.

The above embodiment has been described for the scanner function of the image processing apparatus 11. However, the image processing apparatus 11 may have another function. The image processing apparatus 11 may have a print function. In this case, the terminal apparatus 12 controls printing performed by the image processing apparatus 11, receives data related to an image eligible for the printing, and displays the data related to the image on the display section 112.

The image processing apparatus 11 may be a multi-function peripheral having a plurality of functions such as a scanner function and a print function.

In the above embodiment, the terminal apparatus 12 has been a mobile terminal apparatus. However, the terminal apparatus 12 may be of a stationary type or may be any of various apparatuses having a screen such as the screen of a display.

The terminal apparatus 12 may be referred to as the viewer.

The image processing apparatus 11 may be a server apparatus that submits image data stored in a database or the like to the terminal apparatus 12.

The image data may be data in an electronic book.

The display area on the display section 112 of the terminal apparatus 12 may be used as two separate display areas such as the first display area 411 and second display area 412 or as three or more separate display areas.

When a plurality of display areas are used on the terminal apparatus 12, these display areas may be placed in any layout. The plurality of display areas may be placed on the right and left or vertically when the terminal apparatus 12 is viewed from its front, or may be placed in another layout.

On the terminal apparatus 12, the position of the first display area 411 and the position of the second display area 412 may be reversed.

Although, in the above description, the terminal apparatus 12 has displayed a single intermediate image in the second display area 412, the terminal apparatus 12 may display two or more intermediate images in the second display area 412.

Although, in the above description, the display control section 131 in the terminal apparatus 12 has performed various types of display control, the image processing apparatus 11 may perform display control similar to them instead. In this case, the image processing apparatus 11 performs display control for a control panel, which is attached to the image processing apparatus 11 and on which a display is provided, an external display, a remote display, or the like.

Although, in the above description, the display control section 131 has used the local coordinate system, global coordinate system, and display coordinate system to create display data, this is not a limitation. The display control section 131 may use any other method to create display data.

An example of a structure related to the above embodiment will be described below.

The terminal apparatus 12 in the information processing system 1 executes an image display method described below.

An image display method is for the terminal apparatus 12 that includes a display section 112 having an input section 111 that accepts a touch input. The image display method comprises: acquiring a first image, which is rectangular, and a second image, which is rectangular and has a size different from the first image; displaying, in a first display area 411, a first display image obtained by reducing the first image and a second display image obtained by reducing the second image; displaying, when the first display image is selected by a touch input, a first intermediate image based on the first image in a second display area 412; calculating and storing, when the first intermediate image is commanded to be enlarged and moved by a touch input, the display coordinates of the first intermediate image commanded to be enlarged and moved with respect to an enlargement ratio and a prescribed position determined in advance; and displaying, when the second display image is selected by a touch input, a second intermediate image based on the second image and enlarged with respect to a position of the second image, the position corresponding to the prescribed position, in the second display area 412, according to the stored enlargement ratio and display coordinates.

In FIGS. 4 and 5, the original image of the third thumbnail image 331-3 is an example of the first image; and the original image of the fourth thumbnail image 331-4 is an example of the second image. In FIGS. 4 and 5, the third thumbnail image 331-3 is an example of the first display image; and the fourth thumbnail image 331-4 is an example of the second display image. In FIGS. 4 and 5, the first intermediate image 431 is an example of the first intermediate image based on the first image; and the second intermediate image 432 is an example of the second intermediate image based on the second image. In FIGS. 4 and 5, the first display area 411 and second display area 412 are illustrated.

In the image display method, the prescribed position is any of the central position of the first image, a corner of the first image, and the central position of an edge of the first image; and the position, corresponding to the prescribed position, of the second image is any of the central position, corresponding to the central position of the first image, of the second image, a corner, corresponding to the corner of the first image, of the second image, and the central position, corresponding to the central position of the edge of the first image, of an edge of the second image.

In FIGS. 6 and 7, the ninth target point 731-9 is an example of the central position of the original image; the first target point 731-1, third target point 731-3, fifth target point 731-5, and seventh target point 731-7 are each an example of the corner; and the second target point 731-2, fourth target point 731-4, sixth target point 731-6, and eighth target point 731-8 are each an example of the central position of the edge.

Another position may be used as the prescribed position determined in advance.

In the image display method, the prescribed position is the central position of the first image, a corner of the first image, or the central position of an edge of the first image, whichever is the closest to display coordinates corresponding to the central position, display coordinates corresponding to the corner, and display coordinates corresponding to the central position of the edge.

In FIG. 6, the display coordinates are determined by the third frame 721. In FIG. 7, the display coordinates are determined by the fourth frame 821.

A position determined by another method may be used as the prescribed position determined in advance.

In the image display method, when the first intermediate image displayed in the second display area 412 by being commanded to be enlarged and moved by a touch input includes a corner of the first intermediate image, the corner, corresponding to the corner of the first intermediate image, of the first image is the prescribed position.

In the examples in FIGS. 4 and 5, the first intermediate image 431 and second intermediate image 432 displayed in the second display area 412 include a corner of their respective original images. In this case, the corner may be the prescribed position determined in advance.

A position determined by another method may be used as the prescribed position determined in advance.

In the image display method, the first display image and second display image are placed along the virtual axis 421.

In FIGS. 4 and 5, the virtual axis 421 is illustrated.

The first display image and second display image may be placed in another layout.

In the image display method, a touch input is a pinch-in or pinch-out command. A touch input is made by the user who operates the terminal apparatus 12.

An input in another aspect may be used as a touch input.

An image display apparatus adaptable to an image display method may be provided.

An image display apparatus includes: a display section 112 having an input section 111 that accepts a touch input; a display control section 131 that performs display control in response to a touch input; and a storage section 113 that stores a first image, which is rectangular, and a second image, which is rectangular and has a size different from the first image. The display control section 131: acquires the first image and second image stored in the storage section 113; displays, in a first display area 411, a first display image obtained by reducing the first image and a second display image obtained by reducing the second image; displays, when the first display image is selected by a touch input, a first intermediate image based on the first image in a second display area 412; calculates and stores, when the first intermediate image is commanded to be enlarged and moved by a touch input, the display coordinates of the first intermediate image commanded to be enlarged and moved with respect to an enlargement ratio and a prescribed position determined in advance, the display coordinates being stored in the storage section 113; and displays, when the second display image is selected by a touch input, a second intermediate image based on the second image and enlarged with respect to a position of the second image, the position corresponding to the prescribed position, in the second display area 412, according to the enlargement ratio and display coordinates stored in the storage section 113.

In FIG. 2, the terminal apparatus 12 is an example of an image display apparatus. The terminal apparatus 12 includes the input section 111 and display section 112, which are structured as a touch panel, the display control section 131, and the storage section 113.

A non-transitory computer-readable storage medium storing a display control program adaptable for an image display method may be provided.

A non-transitory computer-readable storage medium storing a display control program causes a terminal apparatus 12 to execute display control, the terminal apparatus 12 including a display section 112 having an input section 111 that accepts a touch input. The image display program comprises: causing the terminal apparatus 12 to acquire a first image, which is rectangular, and a second image, which is rectangular and has a size different from the first image; causing the terminal apparatus 12 to display, in a first display area 411, a first display image obtained by reducing the first image and a second display image obtained by reducing the second image; causing the terminal apparatus 12 to display, when the first display image is selected by a touch input, a first intermediate image based on the first image in a second display area 412; causing the terminal apparatus 12 to calculate and stores, when the first intermediate image is commanded to be enlarged and moved by a touch input, the display coordinates of the first intermediate image commanded to be enlarged and moved with respect to an enlargement ratio and a prescribed position determined in advance, the display coordinates being stored in the storage section 113; and causing the terminal apparatus 12 to display, when the second display image is selected by a touch input, a second intermediate image based on the second image and enlarged with respect to a position of the second image, the position corresponding to the prescribed position, in the second display area 412, according to the enlargement ratio and display coordinates stored in the storage section 113.

In FIG. 2, a computer forming the terminal apparatus 12 executes the display control program.

The display control program, which implements arbitrary constituent sections in arbitrary apparatuses such as the terminal apparatus 12 and image processing apparatus 11 described above, may be recorded in a computer-readable recording medium. The program may be read and executed by a computer system. The computer system referred to here includes an operating system or hardware such as peripherals. The computer-readable recording medium is a portable medium such as a flexible disc, a magneto-optical disc, a ROM or a compact disc-ROM (CD-ROM), or a storage device such as a hard disk drive built into the computer system. Computer-readable recording media include a medium that can retain a program for a certain time such as a volatile memory in a computer system that functions as a server or client when the program is transmitted through a network such as the Internet or a communication line such as a telephone line. The volatile memory may be a RAM. The recording medium may be a non-transitory recording medium.

The above program may be transferred from a computer system in which the program is stored in a storage device or the like to another computer system through a transfer medium or carrier waves in it. The transfer medium that transfers the program refers to a medium having a function for transferring information, like a network such as the Internet and a communication line such as a telephone line.

The above program may implement part of the functions described above. The above program may be a so-called differential file that can implement the above functions by being combined with a program already recorded in the computer system. The differential file may be referred to as the differential program.

The function of an arbitrary constituent section in an arbitrary apparatus such as the terminal apparatus 12 or image processing apparatus 11 described above may be implemented by a processor. Each piece of processing in the embodiment may be implemented by a combination of a processor that operates according to information such as a program and a computer-readable recording medium that stores information such as a program. The processor may be implemented by hardware in which each section has an individual function or by hardware in which functions of individual sections are combined together. The processor may include hardware. The hardware may include at least one of a circuit that processes digital signals and a circuit that processes analog signals. The processor may be structured by using either or both of one or a plurality of circuit devices mounted on a circuit board and one or a plurality of circuit elements. An integrated circuit (IC) or the like may be used as the circuit device. A resistor or a capacitor may be used as the circuit element.

The processor may be a central processing unit (CPU). However, the processor is not limited to a CPU. A graphical processing unit (GPU), a digital signal processor (DSP), or any of various other types of processors may be used as the CPU. The processor may be a hardware circuit implemented by an application-specific integrated circuit (ASIC). The processor may be formed from a plurality of CPUs or from a hardware circuit implemented by a plurality of ASICs. The processor may be formed from a combination of a plurality of CPUs and a hardware circuit implemented by a plurality of ASICs. The processor may include at least one of an amplifier circuit that processes analog signals, a filter circuit, and the like.

So far, an embodiment has been described with reference to the drawings. However, a specific structure is not limited to this embodiment. Designs and the like are also included without departing from the intended scope of the present disclosure.

What is claimed is:

1. An image display method for a terminal apparatus that includes a display section having an input section that accepts a touch input, the method comprising:
   acquiring a first image, which is rectangular, and a second image, which is rectangular and has a size different from the first image;
   displaying, in a first display area, a first display image obtained by reducing the first image and a second display image obtained by reducing the second image;
   displaying, when the first display image is selected by the touch input, a first intermediate image based on the first image in a second display area;
   calculating and storing, when the first intermediate image is commanded to be enlarged and moved by the touch input, a display coordinate of the first intermediate image commanded to be enlarged and moved with respect to an enlargement ratio and a prescribed position determined in advance, the enlargement ratio being determined by a size of the first image and a size of a frame enclosing a portion of the first display image in the first display area that is less than an entirety of the first display image in the first display area; and
   displaying, when the second display image is selected by the touch input, a second intermediate image based on the second image and enlarged with respect to a position of the second image, the position corresponding to the prescribed position, in the second display area, according to the stored enlargement ratio and display coordinate,
   wherein when the first intermediate image displayed in the second display area includes a corner of the first intermediate image, the corner, corresponding to the corner of the first intermediate image, of the first image is the prescribed position determined in advance of the first intermediate image being commanded to be enlarged and moved by the touch input.

2. The image display method according to claim 1, wherein the first display image and the second display image are placed along a virtual axis.

3. The image display method according to claim 1, wherein the touch input is a pinch-in command or a pinch-out command.

4. An image display apparatus comprising:
   a display section having an input section that accepts a touch input;

a display control section that performs display control in response to the touch input; and a storage section that stores a first image, which is rectangular, and a second image, which is rectangular and has a size different from the first image; wherein the display control section acquires the first image and second image stored in the storage section, displays, in a first display area, a first display image obtained by reducing the first image and a second display image obtained by reducing the second image, displays, when the first display image is selected by the touch input, a first intermediate image based on the first image in a second display area, calculates and stores, when the first intermediate image is commanded to be enlarged and moved by the touch input, a display coordinate of the first intermediate image commanded to be enlarged and moved with respect to an enlargement ratio and a prescribed position determined in advance, the display coordinate being stored in the storage section, the enlargement ratio being determined by a size of the first image and a size of a frame enclosing a portion of the first display image in the first display area that is less than an entirety of the first display image in the first display area, and displays, when the second display image is selected by the touch input, a second intermediate image based on the second image and enlarged with respect to a position of the second image, the position of the second image corresponding to the prescribed position determined in advance for the first image, in the second display area, according to the enlargement ratio and display coordinate stored in the storage section, wherein when the first intermediate image displayed in the second display area includes a corner of the first intermediate image, the display control section uses the corner, corresponding to the corner of the first intermediate image, of the first image as the prescribed position determined in advance of the first intermediate image being commanded to be enlarged and moved by the touch input.

5. The image display apparatus according to claim 4, wherein the first display image and the second display image are placed along a virtual axis.

6. The image display apparatus according to claim 4, wherein the touch input is a pinch-in command or a pinch-out command.

7. A non-transitory computer-readable storage medium storing a display control program that causes a terminal apparatus to execute display control, the terminal apparatus including a display section having an input section that accepts a touch input, the program comprising:

causing the terminal apparatus to acquire a first image, which is rectangular, and a second image, which is rectangular and has a size different from the first image;

causing the terminal apparatus to display, in a first display area, a first display image obtained by reducing the first image and a second display image obtained by reducing the second image;

causing the terminal apparatus to display, when the first display image is selected by the touch input, a first intermediate image based on the first image in a second display area;

causing the terminal apparatus to calculate and store, when the first intermediate image is commanded to be enlarged and moved by the touch input, a display coordinate of the first intermediate image commanded to be enlarged and moved with respect to an enlargement ratio and a prescribed position determined in advance, the display coordinate being stored in the storage section, the enlargement ratio being determined by a size of the first image and a size of a frame enclosing a portion of the first display image in the first display area that is less than an entirety of the first display image in the first display area; and causing the terminal apparatus to display, when the second display image is selected by the touch input, a second intermediate image based on the second image and enlarged with respect to a position of the second image, the position corresponding to the prescribed position, in the second display area, according to the enlargement ratio and display coordinate stored in the storage section, wherein when the first intermediate image displayed in the second display area includes a corner of the first intermediate image, the corner, corresponding to the corner of the first intermediate image, of the first image is the prescribed position determined in advance of the first intermediate image being commanded to be enlarged and moved by the touch input.

8. The non-transitory computer-readable storage medium according to claim 7, wherein the first display image and the second display image are placed along a virtual axis.

9. The non-transitory computer-readable storage medium according to claim 7, wherein the touch input is a pinch-in command or a pinch-out command.

* * * * *